United States Patent
Ishita et al.

(10) Patent No.: US 12,479,648 B2
(45) Date of Patent: Nov. 25, 2025

(54) HEAT RETAINING CONTAINER

(71) Applicant: PANASONIC INTELLECTUAL PROPERTY MANAGEMENT CO., LTD., Kadoma (JP)

(72) Inventors: Mitoko Ishita, Shiga (JP); Hideji Kawarazaki, Osaka (JP); Masahiro Kagimoto, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/553,958

(22) PCT Filed: Apr. 12, 2022

(86) PCT No.: PCT/JP2022/017605
§ 371 (c)(1),
(2) Date: Oct. 4, 2023

(87) PCT Pub. No.: WO2022/230660
PCT Pub. Date: Nov. 3, 2022

(65) Prior Publication Data
US 2024/0116693 A1   Apr. 11, 2024

(30) Foreign Application Priority Data
Apr. 26, 2021   (JP) .................... 2021-073809

(51) Int. Cl.
*B65D 81/38*   (2006.01)
(52) U.S. Cl.
CPC ..... *B65D 81/3818* (2013.01); *B65D 81/3816* (2013.01)

(58) Field of Classification Search
CPC ............ B65D 81/3818; B65D 81/3816; B65D 81/3823; B65D 25/108; B65D 25/2808; Y02E 60/14
(Continued)

(56) References Cited

U.S. PATENT DOCUMENTS

| | | | | |
|---|---|---|---|---|
| 4,726,974 A | * | 2/1988 | Nowobilski | F16L 59/065 428/69 |
| 6,164,030 A | * | 12/2000 | Dietrich | F25D 23/063 52/406.2 |

(Continued)

FOREIGN PATENT DOCUMENTS

| | | |
|---|---|---|
| JP | H07-125739 | 5/1995 |
| JP | 3663183 B2 * | 6/2005 |

(Continued)

OTHER PUBLICATIONS

Extended European Search Report issued in European Patent Application No. 22795574.7, Oct. 8, 2024 (8 pages).

(Continued)

*Primary Examiner* — Orlando E Aviles
*Assistant Examiner* — Brijesh V. Patel
(74) *Attorney, Agent, or Firm* — HSML P.C.

(57) ABSTRACT

A heat retaining container (70) includes: an accommodating space (71); and walls (72) including inner surfaces surrounding the accommodating space (71). Heat conductivity of each wall (72) in a surface direction is higher than heat conductivity of the wall (72) in a thickness direction orthogonal to the inner surface of the wall, the surface direction being orthogonal to the thickness direction and extending along the inner surface of the wall.

6 Claims, 11 Drawing Sheets

(58) Field of Classification Search
USPC .................... 220/592.01–592.28; 62/371, 62/457.1–457.2, 457.7
See application file for complete search history.

(56) References Cited

U.S. PATENT DOCUMENTS

| | | | | |
|---|---|---|---|---|
| 6,266,972 | B1* | 7/2001 | Bostic | B65D 81/3823 |
| | | | | 62/530 |
| 6,319,475 | B1* | 11/2001 | Katoh | B01L 3/50851 |
| | | | | 206/524.2 |
| 6,482,332 | B1* | 11/2002 | Malach | C09K 5/066 |
| | | | | 165/104.19 |
| 7,412,846 | B2* | 8/2008 | Sekiya | B65D 81/3823 |
| | | | | 62/457.2 |
| 9,624,022 | B2* | 4/2017 | Ide | F25D 11/006 |
| 2003/0082357 | A1* | 5/2003 | Gokay | E04B 1/803 |
| | | | | 428/34.1 |
| 2003/0126882 | A1 | 7/2003 | Hunter | |
| 2004/0079794 | A1 | 4/2004 | Mayer | |
| 2008/0280120 | A1* | 11/2008 | Fechner | F16L 59/065 |
| | | | | 428/304.4 |
| 2009/0031659 | A1* | 2/2009 | Kalfon | H05K 5/0209 |
| | | | | 137/511 |
| 2015/0153087 | A1* | 6/2015 | Yamashita | F25D 3/00 |
| | | | | 62/457.2 |
| 2015/0166244 | A1 | 6/2015 | Wood et al. | |
| 2015/0197389 | A1* | 7/2015 | Bao | B65D 81/3816 |
| | | | | 220/592.27 |
| 2015/0259126 | A1 | 9/2015 | Mcgoff et al. | |

FOREIGN PATENT DOCUMENTS

| | | | | |
|---|---|---|---|---|
| JP | 2006-8231 | | 1/2006 | |
| JP | 2009-241992 | | 10/2009 | |
| JP | 2013-10523 | | 1/2013 | |
| JP | 2013-103375 | | 5/2013 | |
| JP | 2013103375 | A * | 5/2013 | |
| JP | 5446114 | B2 * | 3/2014 | |
| JP | 2020-164241 | | 10/2020 | |
| KR | 20170061396 | A * | 6/2017 | |
| WO | WO-2015178416 | A1 * | 11/2015 | B32B 27/18 |

OTHER PUBLICATIONS

International Search Report of PCT/JP2022/017605, Jun. 28, 2022, 3 pages.

* cited by examiner

HEAT RETAINING CONTAINER

TECHNICAL FIELD

The present disclosure relates to a heat retaining container.

BACKGROUND ART

A thermally conductive inner container of PTL 1 has been known as a heat retaining container. This inner container is made of metal, such as aluminum, aluminum alloy, or copper. The inner container accommodates a target object and is located in a storage container together with a heat storage medium.

CITATION LIST

Patent Literature

PTL 1: Japanese Laid-Open Patent Application Publication No. 2013-10523

SUMMARY OF INVENTION

Technical Problem

The inner container having high heat conductivity in PTL 1 is cooled by the heat storage medium, and an internal space of the inner container is maintained at a predetermined temperature (for example, 2° C. to 8° C.). However, the inner container having high thermal conductivity also conducts outside warm heat. Therefore, a cooling effect by the heat storage medium is canceled, and a cold reserving time is reduced. However, when the heat conductivity of the inner container is lowered, the heat storage medium does not melt uniformly. With the passage of the cold reserving time, temperature irregularity occurs, and the temperature in the internal space of the inner container becomes non-uniform.

The present disclosure was made to solve the above problems, and an object of the present disclosure is to provide a heat retaining container that can uniformize a temperature in an accommodating space and increase a heat retaining time.

Solution to Problem

A heat retaining container according to a first aspect of the present disclosure includes: an accommodating space; and walls including inner surfaces surrounding the accommodating space. Heat conductivity of each wall in a surface direction is higher than heat conductivity of the wall in a thickness direction orthogonal to the inner surface of the wall, the surface direction being orthogonal to the thickness direction and extending along the inner surface of the wall.

According to this configuration, since the heat conductivity of the wall in the surface direction is high, temperature irregularity at the wall and the heat storage medium that cools the wall is reduced in the surface direction. Moreover, since the heat conductivity of the wall in the thickness direction is low, the heat conduction from the outside of the heat retaining container to the accommodating space is suppressed. Therefore, the temperature in the accommodating space can be uniformized, and the heat retaining time can be increased.

The heat retaining container according to a second aspect of the present disclosure is configured such that: in the first aspect, each wall includes a first wall in which the heat conductivity in the surface direction is higher than the heat conductivity in the thickness direction; and the first wall includes binder resin and thermally conductive fillers which have the heat conductivity higher than the heat conductivity of the binder resin and are blended with the binder resin.

According to this configuration, since the wall includes the thermally conductive fillers having high heat conductivity, the wall is efficiently cooled by the heat storage medium. Therefore, the accommodating space surrounded by the walls can be cooled by the cooled walls to a predetermined temperature.

The heat retaining container according to a third aspect of the present disclosure is configured such that: in the second aspect, the thermally conductive fillers have a shape anisotropy; and the thermally conductive fillers are located in the wall such that a dimension of each thermally conductive filler in the thickness direction is smaller than a dimension of the thermally conductive filler in the surface direction.

According to this configuration, heat moves more easily in the surface direction than in the thickness direction by the thermally conductive fillers. Therefore, the heat conduction from the outside of the heat retaining container to the accommodating space is reduced, and the temperature irregularity of the wall in the surface direction is reduced. Thus, the temperature in the accommodating space can be uniformized, and the heat retaining time can be increased.

The heat retaining container according to a fourth aspect of the present disclosure is configured such that in the second or third aspect, the thermally conductive fillers have an electrical insulation property. According to this configuration, the radio wave can pass through the walls. Therefore, for example, when a thermometer and a transceiver that can transmit the temperature detected by the thermometer are accommodated in the heat retaining container, the transceiver can transmit temperature information, detected by the thermometer, to an outside of the heat retaining container by the radio wave. Thus, since the temperature information of the accommodating space can be acquired at the outside of the heat retaining container without opening the heat retaining container, the temperature increase of the accommodating space by the opening and closing of the heat retaining container is reduced. As a result, the temperature in the accommodating space can be uniformized, and the heat retaining time can be increased.

The heat retaining container according to a fifth aspect of the present disclosure is configured such that: in any one of the first to fourth aspects, each wall includes a first wall in which the heat conductivity in the surface direction is higher than the heat conductivity in the thickness direction; and a ratio of the heat conductivity of the first wall in the thickness direction to the heat conductivity of the first wall in the surface direction is not less than 0.2 and less than 0.8.

According to this configuration, both of the reduction in the heat conduction from the outside of the heat retaining container to the accommodating space by the low heat conductivity of the wall in the thickness direction and the reduction in the temperature irregularity of the wall by the high heat conductivity of the wall in the surface direction can be realized.

The heat retaining container according to a sixth aspect of the present disclosure is configured such that: in any one of the first to fifth aspects, each wall includes a first wall in which the heat conductivity in the surface direction is higher than the heat conductivity in the thickness direction and a second wall made of resin; and the first wall is laminated on at least one of an inner surface and outer surface of the second wall.

According to this configuration, since the first wall is supported by the second wall, the thickness of the first wall can be reduced. Therefore, the heat conduction from the outside of the heat retaining container to the accommodating space can be reduced while reducing the cost of the heat retaining container.

The heat retaining container according to a seventh aspect of the present disclosure is configured such that in the sixth aspect, a thickness of the first wall in the thickness direction is 1 mm or less. According to this configuration, the heat conduction from the outside of the heat retaining container to the accommodating space can be reduced while reducing the cost of the heat retaining container.

The heat retaining container according to an eighth aspect of the present disclosure is configured such that: in the sixth or seventh aspect, the walls include a side wall including a pair of openings, a ceiling wall covering one of the pair of openings so as to open and close the opening, and a bottom wall covering the other of the pair of openings; the side wall includes the first wall and the second wall; and at least one of the walls that are the ceiling wall and the bottom wall does not include the first wall but includes the second wall.

According to this configuration, since at least one of the ceiling wall and the bottom wall does not include the first wall, the cost of the heat retaining container can be reduced. Moreover, since the side wall includes the first wall, the heat conduction between the ceiling wall and the bottom wall occurs through the first wall. Thus, the temperature in the accommodating space surrounded by the side wall, the ceiling wall, and the bottom wall can be uniformized, and the heat retaining time can be increased.

Advantageous Effects of Invention

The present disclosure can provide the heat retaining container which can uniformize the temperature in the accommodating space and increase the heat retaining time.

DESCRIPTION OF EMBODIMENTS

Hereinafter, embodiments of the present disclosure will be specifically described with reference to the drawings. In the following description and the drawings, the same reference signs are used for the same or corresponding components.

Embodiment 1

Figure 1:
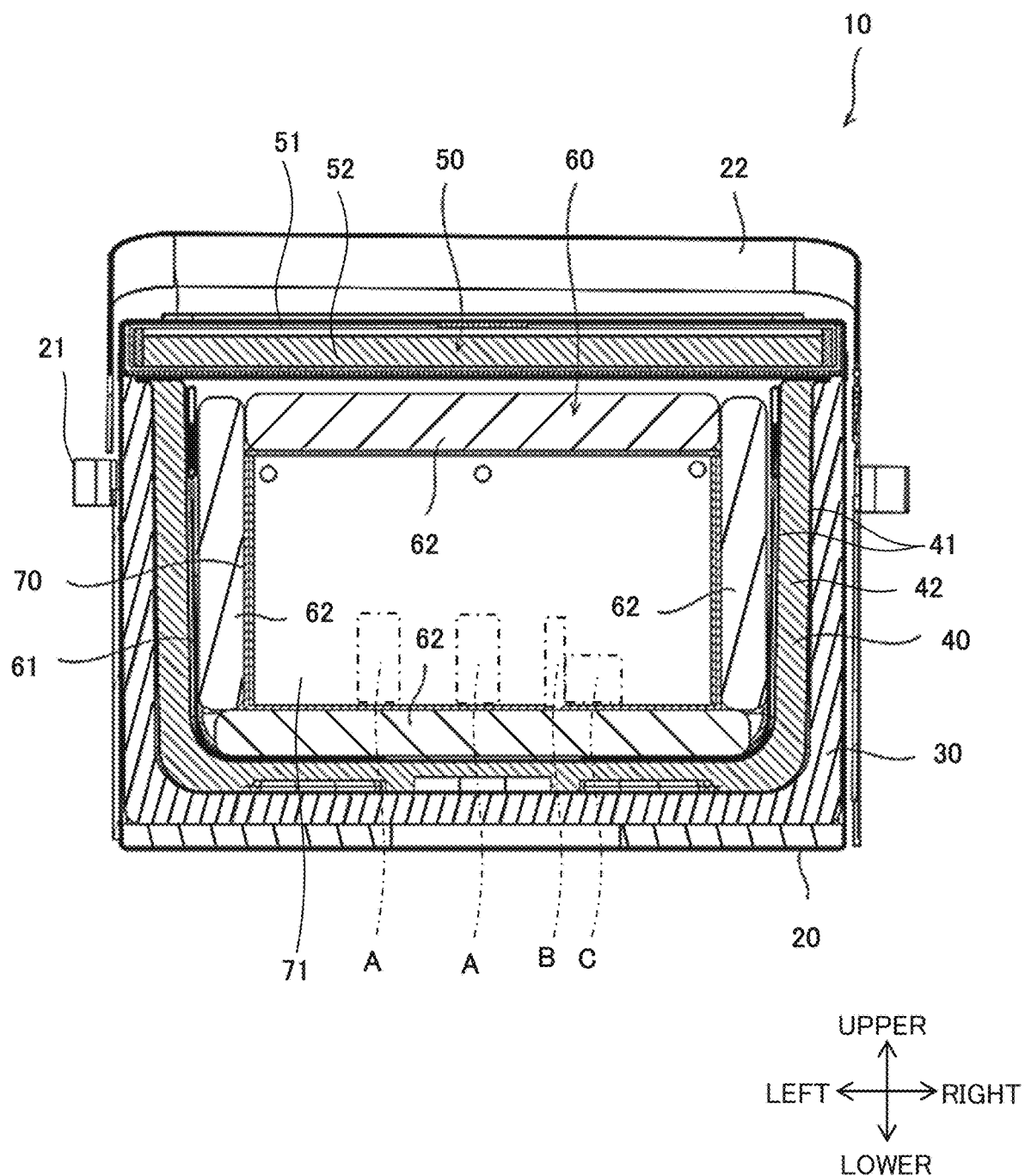
FIG. 1 is a sectional view of a vacuum heat insulating container according to Embodiment 1 of the present disclosure.

A vacuum heat insulating container 10 shown in the example of FIG. 1 is used to transport and preserve an article, such as medicine, a specimen, or food. The vacuum heat insulating container 10 includes an exterior bag 20, a protection box 30, a heat insulating container body 40, a heat insulating lid body 50, and a heat storage unit 60. In the following description, a side where the heat insulating lid body 50 exists with respect to the heat insulating container body 40 is referred to as an upper side, and its opposite side is referred to as a lower side. Moreover, directions which intersect with (for example, are orthogonal to) an upper-lower direction and intersect with (for example, are orthogonal to) each other are referred to as a left-right direction and a front-rear direction. However, the arrangement of the vacuum heat insulating container 10 is not limited to this.

The exterior bag 20 includes a sack and a lid. The sack is formed by using flexible cloth made of chemical fibers, such as nylon or polyester. The sack has a rectangular solid shape, and an upper surface of the sack includes an opening communicating with an internal space of the exterior bag 20. The lid has a plate shape and can open and close the opening of the sack. Moreover, handles 21 which can be held by human hands are respectively attached to left and right side surfaces of the exterior bag 20, and a belt 22 extends between the left and right side surfaces. The protection box 30 and the heat insulating lid body 50 are accommodated in the exterior bag 20.

The protection box 30 is a protective member made of a foaming material, such as polyethylene foam. The protection box 30 has a rectangular solid shape whose upper surface includes an opening communicating with an internal space of the protection box 30. An outer surface of the protection box 30 is covered with the exterior bag 20, and the heat insulating container body 40 is accommodated in the protection box 30.

The heat insulating container body 40 includes, for example, a first outer covering member 41 and a first core member 42. The first outer covering member 41 is a molded body made of a nonmetal material, has a gas barrier property, has, for example, a double wall structure, and includes a space therein. The first core member 42 is a nonmetal porous body. Examples of the nonmetal porous body include: an open-cell body, such as open-cell urethane foam; a foamed resin material, such as styrene foam; a fiber assembly; and an inorganic fine particle assembly. The first core member 42 is accommodated in the first outer covering member 41. Internal pressure of the first outer covering member 41 is lower than external pressure. For example, the internal pressure of the first outer covering member 41 is reduced to predetermined pressure or less. The first outer covering member 41 is sealed. The heat insulating container body 40 has a rectangular solid shape whose upper surface includes an opening communicating with an internal space of the heat insulating container body 40. An outer surface of the heat insulating container body 40 is covered with the protection box 30, and the heat storage unit 60 is accommodated in the heat insulating container body 40.

The heat insulating lid body 50 has a rectangular flat plate shape and covers the opening of the heat insulating container body 40 so as to be able to open and close the opening. The heat insulating lid body 50 includes a second outer covering member 51 and a second core member 52. The second outer covering member 51 is formed by a flexible film including a metal layer and having a gas barrier property. The second outer covering member 51 has a sack shape. The second core member 52 is a nonmetal porous body. Examples of the nonmetal porous body include: an open-cell body, such as open-cell urethane foam; a foamed resin material, such as styrene foam; a fiber assembly; and an inorganic fine particle assembly. The second outer covering member 51 is accommodated in the second outer covering member 51. Internal pressure of the second outer covering member 51 is lower than external pressure. For example, the internal pressure of the second outer covering member 51 is reduced to predetermined pressure or less. The second outer covering member 51 is sealed. Moreover, an outer surface of the heat insulating lid body 50 is covered with the exterior bag 20.

In the vacuum heat insulating container 10 configured as above, an internal space surrounded by the heat insulating container body 40 and the heat insulating lid body 50 covering the opening of the heat insulating container body 40 is formed as a heat insulating space. The heat storage unit 60 is accommodated in this heat insulating space, and a stored article A, such as medicine or a specimen, is stored in the heat storage unit 60. Thus, a temperature around the article in the heat storage unit 60 is maintained by the heat insulating container body 40 and the heat insulating lid body 50 for a long period of time.

Heat Storage Unit

Figure 2:
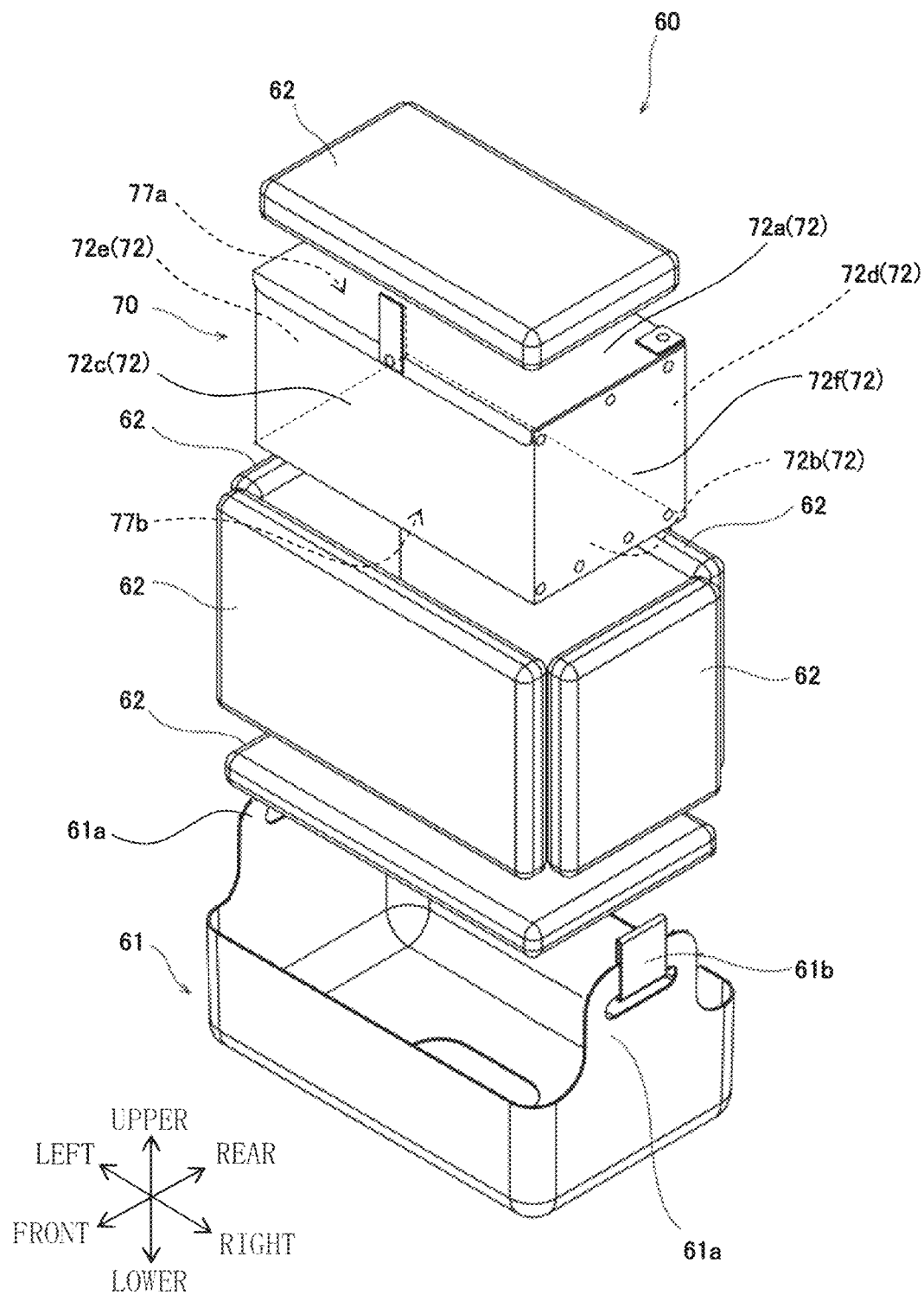
FIG. 2 is an assembly diagram showing an appearance configuration of a heat storage unit accommodated in the vacuum heat insulating container of FIG. 1 when viewed from an oblique direction.
Figure 3:
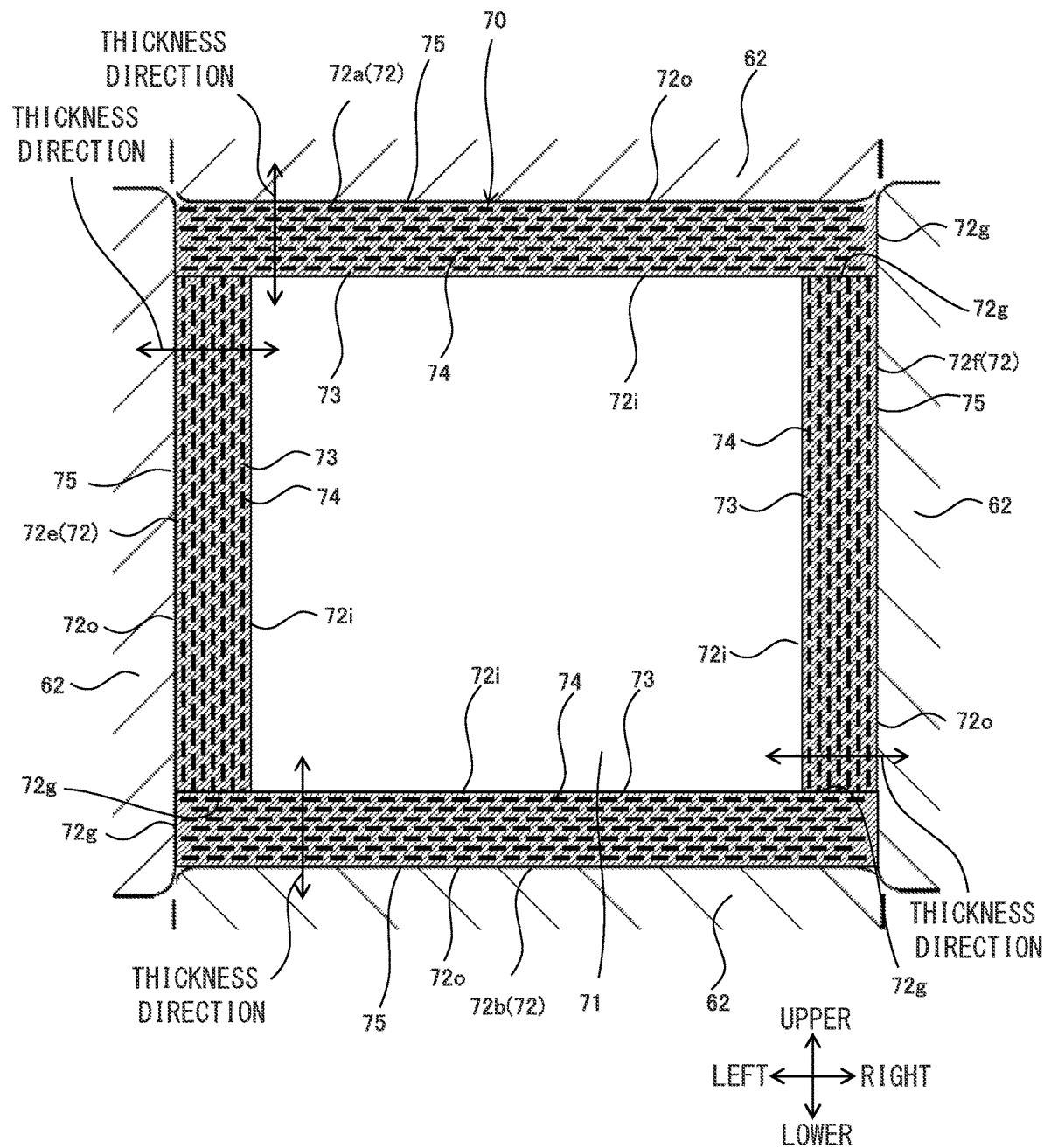
FIG. 3 is a diagram schematically showing a section of a heat retaining container of the heat storage unit of FIG. 2, the section being orthogonal to a front-rear direction.

As shown in the examples of FIGS. 2 and 3, the heat storage unit 60 includes a basket 61, a plurality of heat storage mediums 62, and a heat retaining container 70. The basket 61 is a storing container made of a nonmetal material, such as resin. The basket 61 has a shallow box shape including an opening at an upper portion thereof. The basket 61 includes a pair of upwardly extending portions 61a located and left and right sides of the basket 61. A belt 61b extends between the pair of extending portions 61a. The basket 61 is substantially the same in shape as the internal space of the heat insulating container body 40 (FIG. 1) and is slightly smaller than the internal space of the heat insulating container body 40. The basket 61 is accommodated in the internal space of the heat insulating container body 40 such that an outer surface of the basket 61 is located along an inner surface of the heat insulating container body 40.

For example, six heat storage mediums 62 surround the heat retaining container 70 that is a hexahedron. The heat storage mediums 62 are located on the respective surfaces of the heat retaining container 70. Each heat storage medium 62 has a flat plate shape and is formed such that a heat storage agent is filled in a pack made of a nonmetal material, such as resin. The heat storage medium 62 suppresses a temperature change by utilizing latent heat, sensible heat, and the like generated by a state change among a solid, a liquid, and a gas. A cold reserving material that is the heat storage medium 62 having a cooling function cools the heat retaining container 70 by, for example, heat absorption caused when the solid cold reserving material that has been cooled and solidified is melted at a melting point and changes into a liquid state. Used as the heat storage agent is a material having a state change temperature (melting point, for example) corresponding to a predetermined temperature (for example, 2° C. or more and 8° C. or less) in an accommodating space 71 of the heat retaining container 70. A known material, such as inorganic hydrate or organic hydrate, may be used.

Heat Retaining Container

The heat retaining container 70 includes: the accommodating space 71 as an internal space thereof; and a plurality of walls 72. Each wall 72 has a flat plate shape and includes an inner surface 72i, an outer surface 72o, and end surfaces 72g.

The inner surfaces 72i of the walls 72 surround the accommodating space 71. Each outer surface 72o is located farther from the accommodating space 71 than the inner surface 72i in a thickness direction of the wall 72. Each of the inner surfaces 72i and the outer surfaces 72o has a flat rectangular shape and is located parallel to a surface direction orthogonal to the thickness direction. The thickness of the wall 72 between the inner surface 72i and the outer surface 72o in the thickness direction is constant. Each end surface 72g is connected to an outer peripheral edge of the inner surface 72i and an outer peripheral edge of the outer surface 72o. The end surface 72g is smaller in area than each of the inner surface 72i and the outer surface 72o. The end surface 72g is located parallel to the thickness direction.

The plurality of walls 72 of the heat retaining container 70 include, for example, a ceiling wall 72a, a bottom wall 72b, and side walls. The side walls include, for example, a front side wall 72c, a rear side wall 72d, a left side wall 72e, and a right side wall 72f. The front side wall 72c and the rear side wall 72d are located so as to be spaced apart from each other in the front-rear direction such that the inner surface 72i of the front side wall 72c and the inner surface 72i of the rear side wall 72d are opposed to each other. The left side wall 72e and the right side wall 72f are located so as to be spaced part from each other in the left-right direction such that the inner surface 72i of the left side wall 72e and the inner surface 72i of the right side wall 72f are opposed to each other. Adjacent ones of these four side walls 72c to 72f are connected to each other to form a tubular side wall including a rectangular upper opening 77a and a rectangular lower opening 77b.

The size of the bottom wall 72b is equal to or larger than the size of the lower opening 77b of the tubular side wall. The bottom wall 72b is connected to lower ends of the side walls 72c to 72f so as to cover the lower opening 77b. The bottom wall 72b and the side walls 72c to 72f have a rectangular solid shape whose upper surface includes an upper opening 77a communicating with an internal space. The bottom wall 72b and the side walls 72c to 72f form a container portion of the heat retaining container 70.

The size of the ceiling wall 72a is equal to or larger than the size of the upper opening 77a of the tubular side wall. The ceiling wall 72a is connected to the rear side wall 72d so as to be able to open and close the upper opening 77a. The ceiling wall 72a serves as a lid portion of the heat retaining container 70. With the ceiling wall 72a covering the upper opening 77a of the container portion, the ceiling wall 72a and the bottom wall 72b are located so as to be spaced apart from each other in the upper-lower direction such that the inner surface 72i of the ceiling wall 72a and the inner surface 72i of the bottom wall 72b are opposed to each other. Thus, the accommodating space 71 of the heat retaining container 70 is covered with the six walls 72.

In the heat storage unit 60 configured as above, the heat storage medium 62 at the lower side is located on an inner bottom surface of the basket 61. Next, the heat retaining container 70 is placed on the heat storage medium 62 at the lower side such that the outer surface 72o of the bottom wall 72b is opposed to an upper surface of the heat storage medium 62 at the lower side. Then, the heat storage mediums 62 are inserted into gaps between the outer surfaces 72o of the side walls 72c to 72f and an inner side surface of the basket 61 which is opposed to the side walls 72c to 72f. Then, the heat storage medium 62 at the upper side is placed on the outer surface 72o of the ceiling wall 72a. Thus, with the six walls 72 contacting the heat storage mediums 62, the periphery of the heat retaining container 70 is covered with the heat storage mediums 62.

Each of the gaps between the outer surfaces 72o of the side walls 72c to 72f and the inner side surface of the basket 61 is equal to or substantially equal to the thickness of the heat storage medium 62 between a surface of the heat storage medium 62 which is opposed to the outer surface 72o of the corresponding side wall (72c to 72f) and a surface of the heat storage medium 62 which is opposed to the inner side surface of the basket 61. Therefore, the heat storage medium 62 inserted into the gap contacts the heat retaining container 70 and fills the gap between the heat retaining container 70 and the basket 61. Thus, the heat storage mediums 62 can support the heat retaining container 70 with respect to the basket 61 while efficiently cooling the heat retaining container 70, and can reduce vibrations and the like of the heat retaining container 70 and the stored article A.

The area of the upper surface of the heat storage medium 62 at the lower side is equal to or larger than the area of the outer surface 72o of the opposing bottom wall 72b, and the upper surface of the heat storage medium 62 at the lower side covers the entire outer surface 72o of the bottom wall 72b. As with the heat storage medium 62 at the lower side, each of the areas of the surfaces of the heat storage mediums 62 at the upper side, the front side, the rear side, the left side, and the right side is equal to or larger than the area of the outer surface 72o of the opposing wall 72, and each of the surfaces of the heat storage mediums 62 at the upper side, the front side, the rear side, the left side, and the right side covers the outer surface 72o of the opposing wall 72. Therefore, the walls 72 of the heat retaining container 70 are uniformly cooled by the heat storage mediums 62 in directions along the surfaces of the walls 72, and the accommodating space 71 surrounded by the cooled walls 72 is cooled and maintained at a predetermined temperature.

Walls of Heat Retaining Container

The walls 72 of the heat retaining container 70 include first walls 75. Heat conductivity c2 of each of the first walls 75 in the surface direction is higher than heat conductivity c1 of each of the first walls 75 in the thickness direction. Therefore, the heat conductivity c2 of each wall 72 in the surface direction is higher than the heat conductivity c1 of the wall 72 in the thickness direction. Thus, in the wall 72, the amount of heat that passes, per unit time, through a plane which is orthogonal to a movement direction of the heat and has a unit area is larger in the surface direction than in the thickness direction. In the example of FIG. 3, each of the thickness direction of the ceiling wall 72a and the thickness direction of the bottom wall 72b is the upper-lower direction, each of the thickness direction of the front side wall 72c and the thickness direction of the rear side wall 72d is the front-rear direction, and each of the thickness direction of the left side wall 72e and the thickness direction of the right side wall 72f is the left-right direction.

For example, a ratio c1/c2 of the heat conductivity c1 of each of the first walls 75 of the wall 72 in the thickness direction to the heat conductivity c2 of each of the first walls 75 of the wall 72 in the surface direction is not less than 0.2 and less than 0.8. For example, the heat conductivity c1 in the thickness direction is not less than 0.5 W/mK and not more than 2.5 W/mK, and the heat conductivity c2 in the surface direction is not less than 1 W/mK and not more than 5 W/mK.

For example, when heat is transferred from an outside of the heat retaining container 70 to the wall 72 in the thickness direction and reaches the accommodating space 71, the temperature in the accommodating space 71 increases, and a cold reserving time of the heat retaining container 70 decreases. However, since the heat conductivity c1 of the wall 72 in the thickness direction is low, the amount of heat transferred from the outer surface 72o of the wall 72 to the inner surface 72i can be reduced. Thus, the amount of heat transferred from the outside of the heat retaining container 70 through the wall 72 to the accommodating space 71 can be reduced, and the heat retaining time in the accommodating space 71 can be increased.

Moreover, since the heat storage medium 62 melts from its surface, the temperature of the heat storage medium 62 is lower at its middle. Therefore, the temperature of the wall 72 of the heat retaining container 70 cooled by the heat storage medium 62 tends to be lower at its middle than at its outer peripheral edge in the surface direction. However, since the heat conductivity c2 of the wall 72 in the surface direction is high, heat easily moves in the surface direction in the wall 72, and the temperature of the wall 72 is uniformized in the surface direction. Therefore, the temperature in the accommodating space 71 surrounded by the walls 72 can be uniformized.

As above, since the temperature of the wall 72 is uniformized in the surface direction, the temperature of the heat storage medium 62 contacting the wall 72 is also uniformized in the surface direction. Therefore, the distribution of the melting of the heat storage medium 62 in the surface direction is uniformized, and the uniform cold reserving effect of the heat storage medium 62 can be obtained for a long period of time. Thus, the uniformized temperature state in the accommodating space 71 surrounded by the walls 72 can be maintained for a long period of time.

Each of the first walls 75 of the wall 72 includes binder resin 73 and thermally conductive fillers 74. The thermally conductive fillers 74 have heat conductivity higher than the heat conductivity of the binder resin 73 and are blended with the binder resin 73. By the thermally conductive fillers 74 having high heat conductivity, the wall 72 is efficiently cooled by the heat storage medium 62. Therefore, the temperature in the accommodating space 71 surrounded by the walls 72 can be uniformized.

The binder resin 73 is resin by which the wall 72 can be formed even when the thermally conductive fillers 74 are blended with the binder resin 73. For example, the binder resin 73 is thermoplastic resin. Examples of the binder resin 73 include ABS, polypropylene, polycarbonate, polybutylene terephthalate, nylon 6, nylon 66, polyphenylene sulfide, and polystyrene.

The thermally conductive fillers 74 are, for example, inorganic substances, and examples include: magnesium oxide (MgO), anhydrous magnesium carbonate ($MgCO_3$), magnesium hydroxide (Mg(OH)$_2$), silicon oxide (fused silica; SiO$_2$), aluminum oxide (Al$_2$O$_3$), hexagonal boron nitride (BN), silicon nitride (Si$_3$N$_4$), aluminum nitride (AlN), and talc (Mg$_3$Si$_4$O$_{10}$(OH)$_2$).

Each thermally conductive filler 74 has, for example, a shape anisotropy. Examples of the shapes of the thermally conductive fillers 74 include: a plate shape, such as a flat shape and a scale shape; and a needle shape, such as a rod shape and a fiber shape. The thermally conductive filler 74 is oriented such that a longitudinal direction thereof is parallel to or substantially parallel to the surface direction of the wall 72. An angle between the longitudinal direction of the thermally conductive filler 74 and the surface direction is 0° C. or more and is smaller than an angle between the longitudinal direction of the thermally conductive filler 74 and the thickness direction. Therefore, the thermally conductive filler 74 is located at the wall 72 such that the dimension of the thermally conductive filler 74 in the thickness direction is smaller than the dimension of the thermally conductive filler 74 in the surface direction.

For example, the thermally conductive filler 74 having the plate shape includes a plurality of surfaces and is oriented such that a largest main surface among the plurality of surfaces is parallel to or substantially parallel to the inner surface 72i of the wall 72. An angle between the main surface of the thermally conductive filler 74 having the plate shape and the surface direction is 0° C. or more and is smaller than an angle between the main surface and the thickness direction. Moreover, the thermally conductive filler 74 having the needle shape is oriented such that the longitudinal direction thereof is parallel to or substantially parallel to the inner surface 72i of the wall 72. An angle between the longitudinal direction of the thermally conductive filler 74 having the needle shape and the surface direction is 0° C. or more and is smaller than an angle between the longitudinal direction of the thermally conductive filler 74 and the thickness direction.

Therefore, in the wall 72, the thermally conductive filler 74 is located such that a maximum dimension thereof in the surface direction is larger than a maximum dimension thereof in the thickness direction. Thus, a ratio of the thermally conductive filler 74 to the binder resin 73 per unit length in the surface direction of the wall 72 is higher than a ratio of the thermally conductive filler 74 to the binder resin 73 per unit length in the thickness direction of the wall 72.

Since the heat conductivity c1 of the wall 72 in the thickness direction is lower than the heat conductivity c2 of the wall 72 in the surface direction, the heat conduction from the outside of the heat retaining container 70 to the accommodating space 71 can be reduced, and the heat retaining time in the accommodating space 71 can be increased. On the other hand, since the heat conductivity c2 of the wall 72 in the surface direction is higher than the heat conductivity c1 of the wall 72 in the thickness direction, the temperature of the wall 72 of the heat retaining container 70 and the temperature of the heat storage medium 62 can be uniformized in the surface direction.

The thermally conductive fillers 74 and the binder resin 73 have, for example, an electrical insulation property. In this case, the wall 72 including the binder resin 73 and the thermally conductive fillers 74 blended with the binder resin 73 has the electrical insulation property, and therefore, electricity hardly flows in the wall 72.

For example, a thermometer B (FIG. 1) and a transceiver C (FIG. 1) are accommodated in the accommodating space 71 surrounded by the walls 72 having the electrical insulation property. The thermometer B is electrically connected to the transceiver C. The thermometer B detects the temperature of the accommodating space 71 and outputs the temperature to the transceiver C. The transceiver C transmits the detected temperature of the thermometer B through wireless communication. The radio wave of the transceiver C passes through the wall 72 having the electrical insulation property.

Another transceiver that can perform wireless communication with the transceiver C is located outside the vacuum heat insulating container 10. This transceiver receives the detected temperature of the thermometer B which is transmitted from the transceiver C. Thus, the temperature in the accommodating space 71 of the heat retaining container 70 can be acquired at the outside of the heat retaining container 70 without opening the heat retaining container 70 and without forming a through hole at the heat retaining container 70, the through hole being used to pull out a cord of the thermometer B to the outside of the heat retaining container 70. Therefore, temperature irregularity of the accommodating space 71 due to opening and closing of the heat retaining container 70 and the through hole can be reduced.

Moreover, in the vacuum heat insulating container 10, the heat storage mediums 62, the basket 61, the heat insulating container body 40, the protection box 30, the exterior bag 20, etc. which are located outside the heat retaining container 70 are also made of, for example, a nonmetal material. In this case, the radio wave from the transceiver C can be received by another transceiver located at the outside of the vacuum heat insulating container 10. Therefore, the temperature irregularity of the accommodating space 71 due to opening and closing of the vacuum heat insulating container 10 and the through hole can be reduced.

The thermally conductive filler 74 does not have to contain, for example, carbon. Since the color of carbon is dark, it is difficult to color the wall 72 containing carbon. On the other hand, according to the thermally conductive filler 74 that does not contain carbon, the wall 72 with which the thermally conductive fillers 74 are blended can be easily colored. Therefore, the design of the heat retaining container 70 can be improved, and the ease of identification of the heat retaining container 70 by the color can be improved.

Method of Forming Wall

Figure 4:
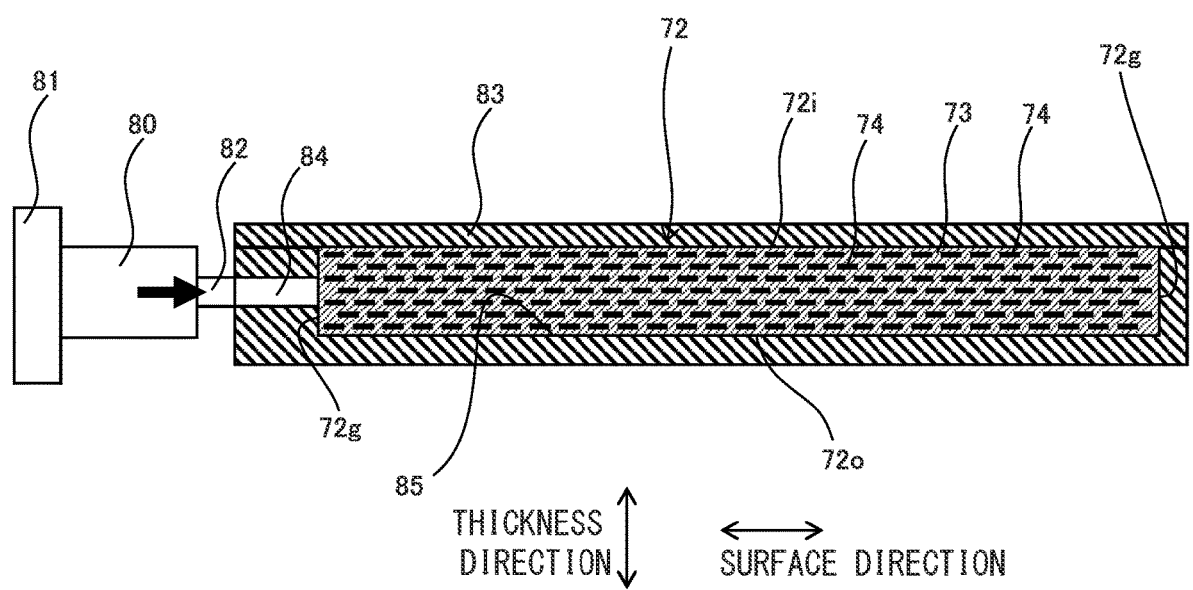
FIG. 4 is a diagram schematically showing a method of manufacturing a wall of a cold reserving container of FIG. 3.

The wall 72 containing the thermally conductive fillers 74 is formed by, for example, injection molding. In the example of FIG. 4, the binder resin 73 with which the thermally conductive fillers 74 are blended is heated and melted in a cylinder 80. A nozzle 82 of a tip of the cylinder 80 is connected to an injection passage 84 of a mold 83, and the binder resin 73 is pushed out from the cylinder 80 by a screw 81. Thus, the binder resin 73 is pushed from the cylinder 80 through the nozzle 82 and the injection passage 84 into a cavity 85 that is an internal space of the mold 83. Then, after the binder resin 73 is cooled and solidified in the cavity 85 of the mold 83, the mold 83 is split, and the binder resin 73 with which the thermally conductive fillers 74 are blended is taken out as the wall 72 from the cavity 85.

The nozzle 82 of the cylinder 80 is a columnar space having an axis extending in the surface direction. The injection passage 84 is a columnar space having an axis extending in the surface direction, and one end of the injection passage 84 in the surface direction is connected to the cavity 85. When injecting the binder resin 73 from the cylinder 80 into the mold 83, the other end of the injection passage 84 is connected to the nozzle 82. Thus, the cylinder 80 communicates with the cavity 85 through the nozzle 82 and the injection passage 84. The cavity 85 is a space having a shape and size corresponding to a shape and size of the wall 72. For example, the cavity 85 has a rectangular flat plate shape. Inner surfaces of the mold 83 include surfaces which surround the cavity 85 and form the inner surface 72*i*, the outer surface 72*o*, and the end surfaces 72*g* of the wall 72. The injection passage 84 is connected to the surface that forms the end surface 72*g* of the wall 72 among the inner surfaces of the mold 83, and the surface that forms the end surface 72*g* of the wall 72 is orthogonal to the surface direction.

As above, the nozzle 82 and the injection passage 84 extend along the surface direction, and the binder resin 73 with which the thermally conductive fillers 74 are blended moves in the nozzle 82 and the injection passage 84 in the surface direction. Moreover, a section of the nozzle 82 which is orthogonal to the surface direction and a section of the injection passage 84 which is orthogonal to the surface direction are equal in size to or substantially equal in size to each other. Each of the section of the nozzle 82 which is orthogonal to the surface direction and the section of the injection passage 84 which is orthogonal to the surface direction is smaller than each of a section of the cylinder 80 which is orthogonal to the surface direction and a section of the cavity 85 which is orthogonal to the surface direction. Therefore, while the binder resin 73 with which the thermally conductive fillers 74 are blended passes through the nozzle 82 and the injection passage 84 in the surface direction, the longitudinal direction of each thermally conductive filler 74 is made parallel to or substantially parallel to the surface direction. Thus, in the binder resin 73 which has been injected from the injection passage 84 into the cavity 85, the thermally conductive fillers 74 are oriented such that the longitudinal direction of each thermally conductive filler 74 is parallel to or substantially parallel to the surface direction.

Embodiment 2

Figure 5:
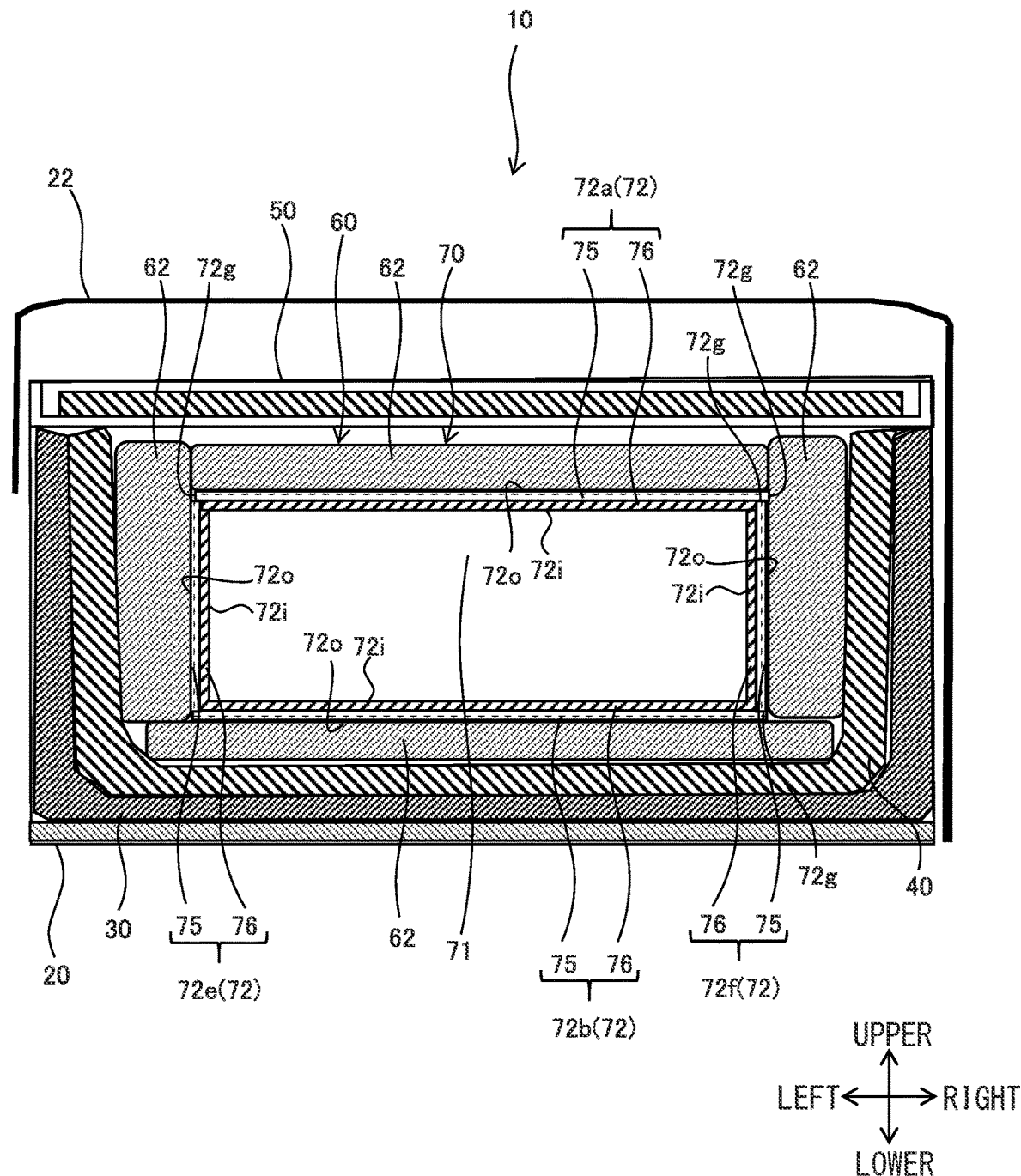
FIG. 5 is a sectional view of the vacuum heat insulating container according to Embodiment 2 of the present disclosure.

In Embodiment 1, the entire wall 72 of the heat retaining container 70 is the first walls 75. However, in the heat retaining container 70 according to Embodiment 2, as shown in the example of FIG. 5, part of the wall 72 is the first wall 75. Since this wall 72 includes the first walls 75, the heat conductivity c2 of the wall 72 in the surface direction is higher than the heat conductivity c1 of the wall 72 in the thickness direction.

Specifically, each wall 72 includes: one of the first walls 75 in which the heat conductivity c2 in the surface direction is higher than the heat conductivity c1 in the thickness direction; and a second wall 76 made of resin. The one of the first walls 75 is laminated on an outer surface of the second wall 76. Each of the inner surface and outer surface of the one of the first walls 75 and the inner surface and outer surface of the second wall 76 has a flat rectangular shape, i.e., a flat plate shape. The size of the inner surface of the one of the first walls 75 is equal to or larger than the size of the outer surface of the second wall 76, and the inner surface of the one of the first walls 75 covers the entire outer surface of the second wall 76. As above, the one of the first walls 75 and the second wall 76 are laminated on each other in the thickness direction to form the wall 72.

The inner surface of the one of the first walls 75 and the outer surface of the second wall 76 contact each other in the wall 72. The inner surface 72*i* of the wall 72 is formed by the inner surface of the second wall 76, and the outer surface 72*o* of the wall 72 is formed by the outer surface of the one of the first walls 75. Thus, the one of the first walls 75 contacts the heat storage medium 62 and is uniformly cooled by the heat storage medium 62 in the surface direction. Then, heat is transferred between the one of the first walls 75 and the second wall 76, and the entire wall 72 is cooled. Thus, the temperature of the accommodating space 71 surrounded by the walls 72 is lowered to a predetermined temperature. Since the heat conductivity c2 of the wall 72 in the surface direction is higher than the heat conductivity c1 of the wall 72 in the thickness direction, the temperature of the accommodating space 71 can be uniformized, and the heat retaining time can be increased.

In the heat retaining container 70 in the example of FIG. 5, the second walls 76 of the walls 72 that are the bottom wall 72*b* and the side walls 72*c* to 72*f*, i.e., five second walls 76 are located so as to form a container shape. This container portion formed by these second walls 76 has a box shape whose upper side is open, and is formed integrally. The first walls 75 are fixed to the outer surfaces of the container portion of the second walls 76 by a fixing member, such as an adhesive or a double-sided tape. Thus, the bottom wall 72*b* and the side walls 72*c* to 72*f* form the container portion of the heat retaining container 70 by the first walls 75 and the second walls 76 laminated on the inner surfaces of the first walls 75.

The second wall 76 of the ceiling wall 72*a* is located so as to be able to open and close the upper opening of the container portion of the second walls 76. One of the first walls 75 is fixed onto the outer surface of the second wall 76 of the ceiling wall 72*a* by the fixing member, such as an adhesive or a double-sided tape. Thus, the ceiling wall 72*a* serves as the lid portion of the heat retaining container 70 which includes the one of the first walls 75 and the second wall 76 laminated on the inner surface of the one of the first walls 75 and covers the upper opening of the container portion of the heat retaining container 70 so as to be able to open and close the upper opening.

The heat conductivity of the second wall 76 is lower than the heat conductivity of the first walls 75. For example, the heat conductivity of the second wall 76 in the thickness direction and the heat conductivity of the second wall 76 in the surface direction are equal to each other, and a difference therebetween is zero. The second wall 76 is higher in mechanical strength, such as tensile strength, compressive strength, and impact strength, than the first wall 75. The second wall 76 is made of resin, such as polypropylene resin.

As above, the wall 72 includes the second wall 76 having excellent mechanical strength. Therefore, the damage of the heat retaining container 70 can be reduced while reducing the thickness of the first walls 75. By reducing the thickness of the first walls 75, cost reduction can be achieved, and the heat conduction of the wall 72 in the thickness direction can be suppressed. Thus, the temperature in the accommodating space 71 can be uniformized, and the heat retaining time can be increased.

The ratio c1/c2 of the heat conductivity c1 of the first walls 75 in the thickness direction to the heat conductivity c2 of the first walls 75 in the surface direction is not less than 0.2 and less than 0.8. The first wall 75 includes the binder resin 73 and the thermally conductive fillers 74 which have the heat conductivity higher than the heat conductivity of the binder resin 73 and are blended with the binder resin 73. The thermally conductive filler 74 has, for example, the shape anisotropy, and is located in the wall 72 such that a dimension thereof in the thickness direction is smaller than a dimension thereof in the surface direction. The thermally conductive filler 74 has, for example, the electrical insulation property. As shown in the example of FIG. 4, the wall 72 is formed by, for example, injection molding.

Figure 6:
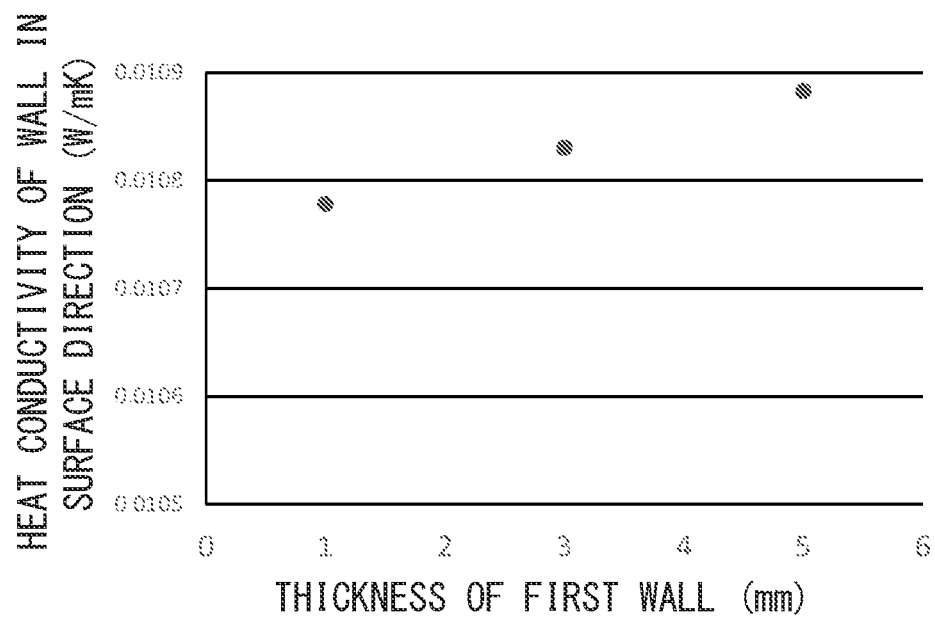
FIG. 6 is a graph showing a relationship between the thickness of a first wall and heat conductivity of a wall in a surface direction.

The thickness of the first walls 75 in the thickness direction is 5 mm or less, preferably 3 mm or less, and further preferably 1 mm or less. As shown in the graph of FIG. 6, when the thickness of the first walls 75 is 5 mm or less, the wall 72 including the first walls 75 is high in heat conductivity (W/mK) in the surface direction. Therefore, the temperature irregularity of the wall 72 including the first walls 75 is reduced in the surface direction. Thus, the temperature in the accommodating space 71 in the heat retaining container can be uniformized, and the heat retaining time can be increased.

Figure 7:
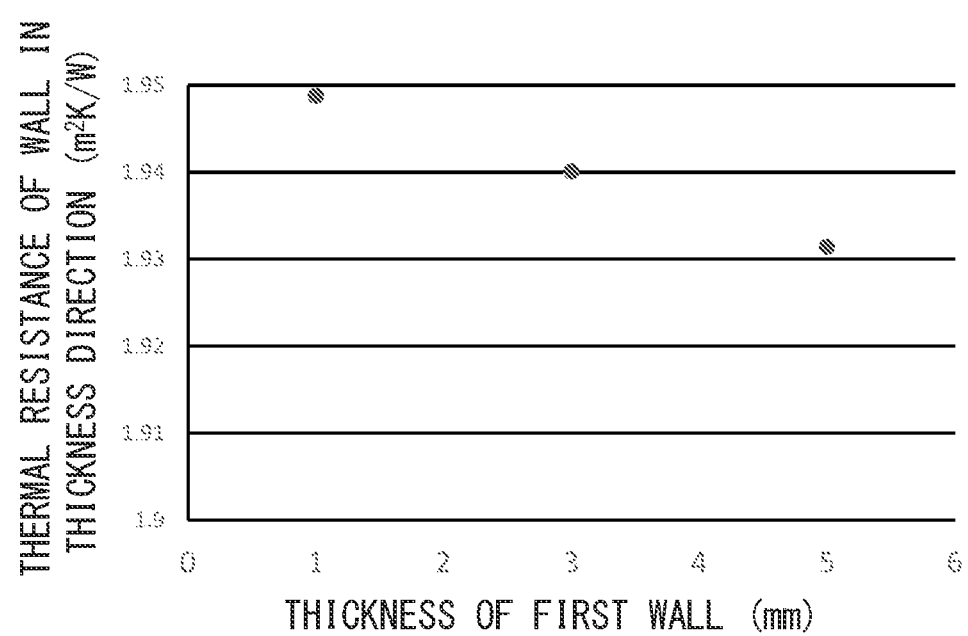
FIG. 7 is a graph showing a relationship between the thickness of the first wall and thermal resistivity of the wall in the thickness direction.

As shown in the graph of FIG. 6, as the thickness of the first walls 75 increases, the heat conductivity (W/mK) of the wall 72 including the first walls 75 in the surface direction increases, and the effect of uniformizing the temperature of the wall 72 in the surface direction improves. However, as shown in the graph of FIG. 7, as the thickness of the first walls 75 increases, thermal resistivity ($m^2K/W$) of the wall 72 including the first walls 75 in the thickness direction decreases, and heat outside the heat retaining container 70 is easily transferred to the accommodating space 71 through the wall 72 in the thickness direction. As above, as the thickness of the first walls 75 increases, the uniformization of the temperature in the accommodating space 71 improves. However, the amount of heat transferred from the outside to the wall 72 increases, and the temperature of a corner of the accommodating space 71 tends to be higher than the temperature of a middle of the accommodating space 71. Thus, temperature variation in the accommodating space 71 in the thickness direction easily occurs.

Figure 8:
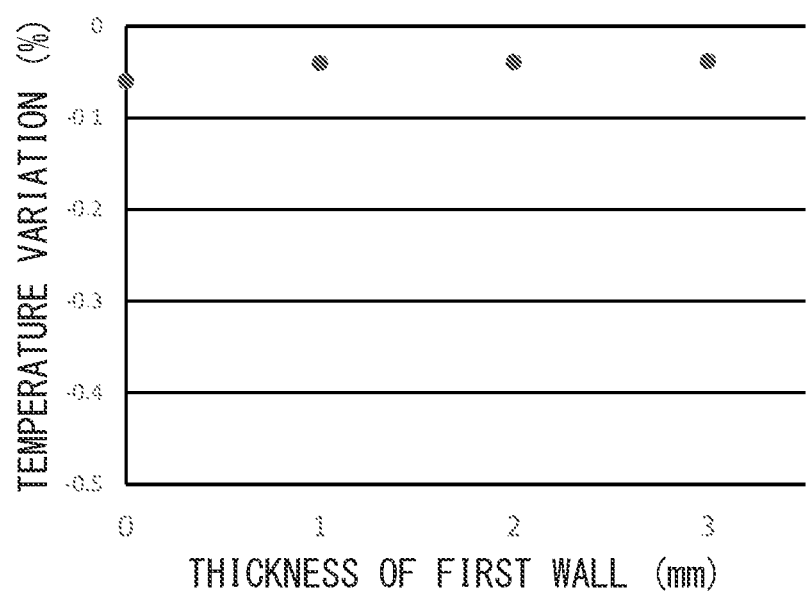
FIG. 8 is a graph showing a relationship between the thickness of the first wall and a temperature variation in an accommodating space.

On the other hand, as shown in the graph of FIG. 8, when the thickness of the first walls 75 is 3 mm or less, the temperature variation in the accommodating space 71 in the thickness direction is small in value. This temperature variation is a value obtained by subtracting the temperature of the corner of the accommodating space 71 from the temperature of the middle of the accommodating space 71 and then dividing the obtained temperature difference by the temperature of the middle. As above, when the thickness of the first walls 75 is 3 mm or less, the temperature in the accommodating space 71 in the heat retaining container can be uniformized, and the heat retaining time can be increased. Moreover, when the thickness of the first walls 75 is 1 mm or less, the temperature variation is small. Therefore, while uniformizing the temperature in the accommodating space 71 in the heat retaining container and increasing the heat retaining time, the cost reduction is realized.

Modified Example 1

Figure 9:
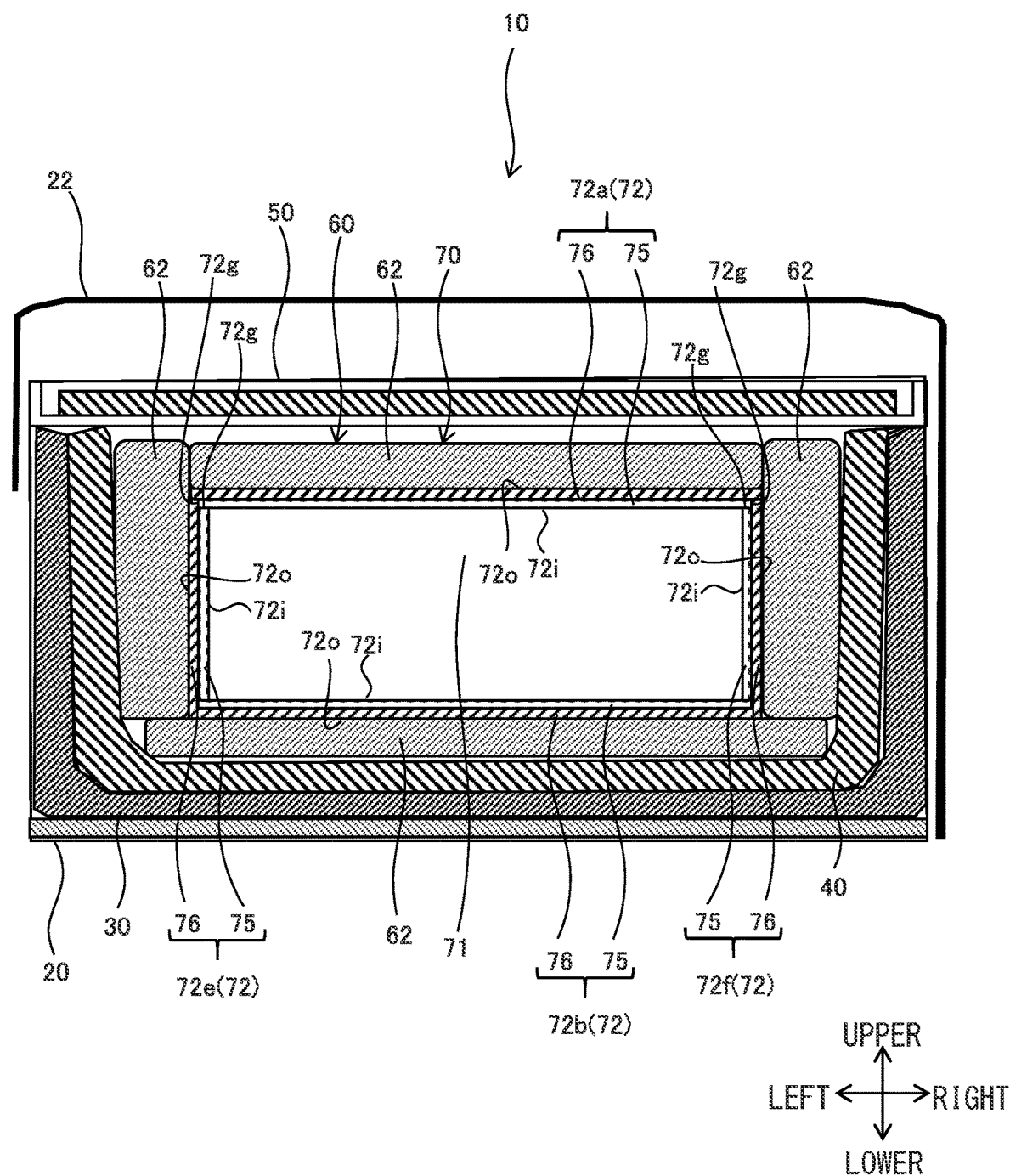
FIG. 9 is a sectional view of the vacuum heat insulating container according to Modified Example 1.

In the heat retaining container 70 in the example of FIG. 5, the first walls 75 of the wall 72 are laminated on the outer surface of the second wall 76. However, in the heat retaining container 70 according to Modified Example 1, as shown in the example of FIG. 9, the first walls 75 of the wall 72 are laminated on the inner surface of the second wall 76. In the wall 72, the first walls 75 may be laminated on both of the inner surface and outer surface of the second wall 76.

Specifically, as in the example of FIG. 9, the wall 72 includes: the first walls 75 in which the heat conductivity c2 in the surface direction is higher than the heat conductivity c1 in the thickness direction; and the second wall 76 made of resin. The first walls 75 are laminated on the inner surface of the second wall 76. The outer surface of the first wall 75 contacts the inner surface of the second wall 76, and the first wall 75 and the second wall 76 form the wall 72 having the flat plate shape. The outer surface 72o of the wall 72 is formed by the outer surface of the second wall 76, and the inner surface 72i of the wall 72 is formed by the inner surface of the first walls 75. Thus, the second wall 76 and the first wall 75 are cooled by the heat storage medium 62. Since the temperature of the first walls 75 in the surface direction is uniformized, the temperature of the accommodating space 71 surrounded by the first walls 75 is also uniformized, and the heat retaining time is increased.

Modified Example 2

In the heat retaining container 70 in the example of FIG. 5 and the heat retaining container 70 in the example of FIG. 9, each of the walls 72 that are the ceiling wall 72a, the bottom wall 72b, and the side walls 72c to 72f includes the first walls 75 and the second wall 76. On the other hand, in the heat retaining container 70 according to Modified Example 2, each of the walls 72 that are the side walls 72c to 72f includes the first wall 75 and the second wall 76. At least one of the walls 72 that are the ceiling wall 72a and the bottom wall 72b does not include one of the first walls 75 but includes the second wall 76.

Figure 10:
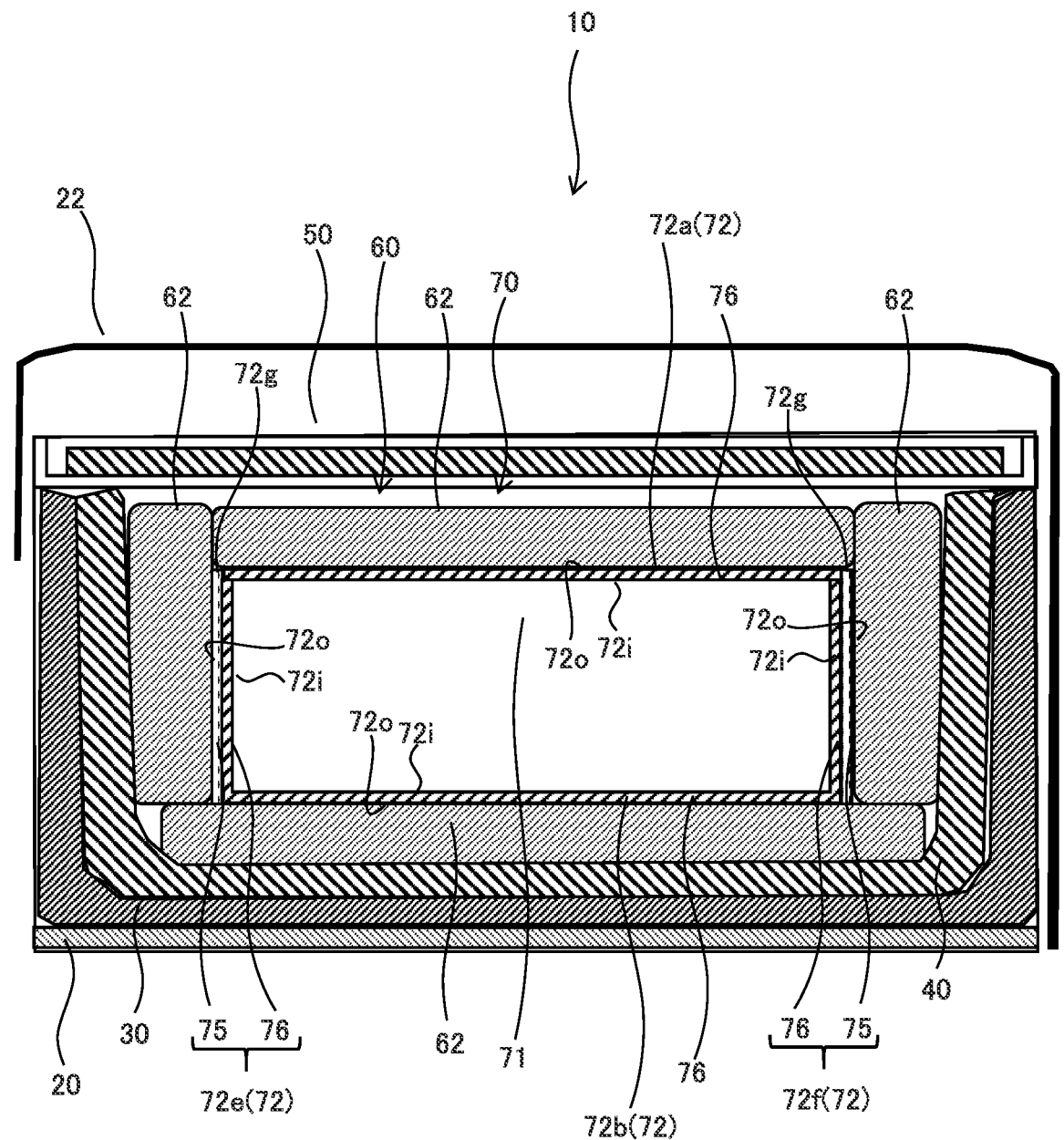
FIG. 10 is a sectional view of the vacuum heat insulating container according to Modified Example 2.

In the heat retaining container 70 in the example of FIG. 10, each of the walls 72 that are the side walls 72c to 72f includes the second wall 76 and the first walls 75 laminated on the outer surface of the second wall 76. Therefore, the inner surfaces of the side walls 72c to 72f are formed by the inner surfaces of the second walls 76, and the outer surfaces of the side walls 72c to 72f are formed by the outer surfaces of the first walls 75. On the other hand, each of the walls 72 that are the ceiling wall 72a and the bottom wall 72b includes the second wall 76. Therefore, each of the inner surfaces of the ceiling wall 72a and the bottom wall 72b is formed by the inner surface of the second wall 76, and each of the outer surfaces of the ceiling wall 72a and the bottom wall 72b is formed by the outer surface of the second wall 76. The ceiling wall 72a may include one of the first walls 75 and the second wall 76. Or, the bottom wall 72b may include one of the first walls 75 and the second wall 76.

Figure 11:
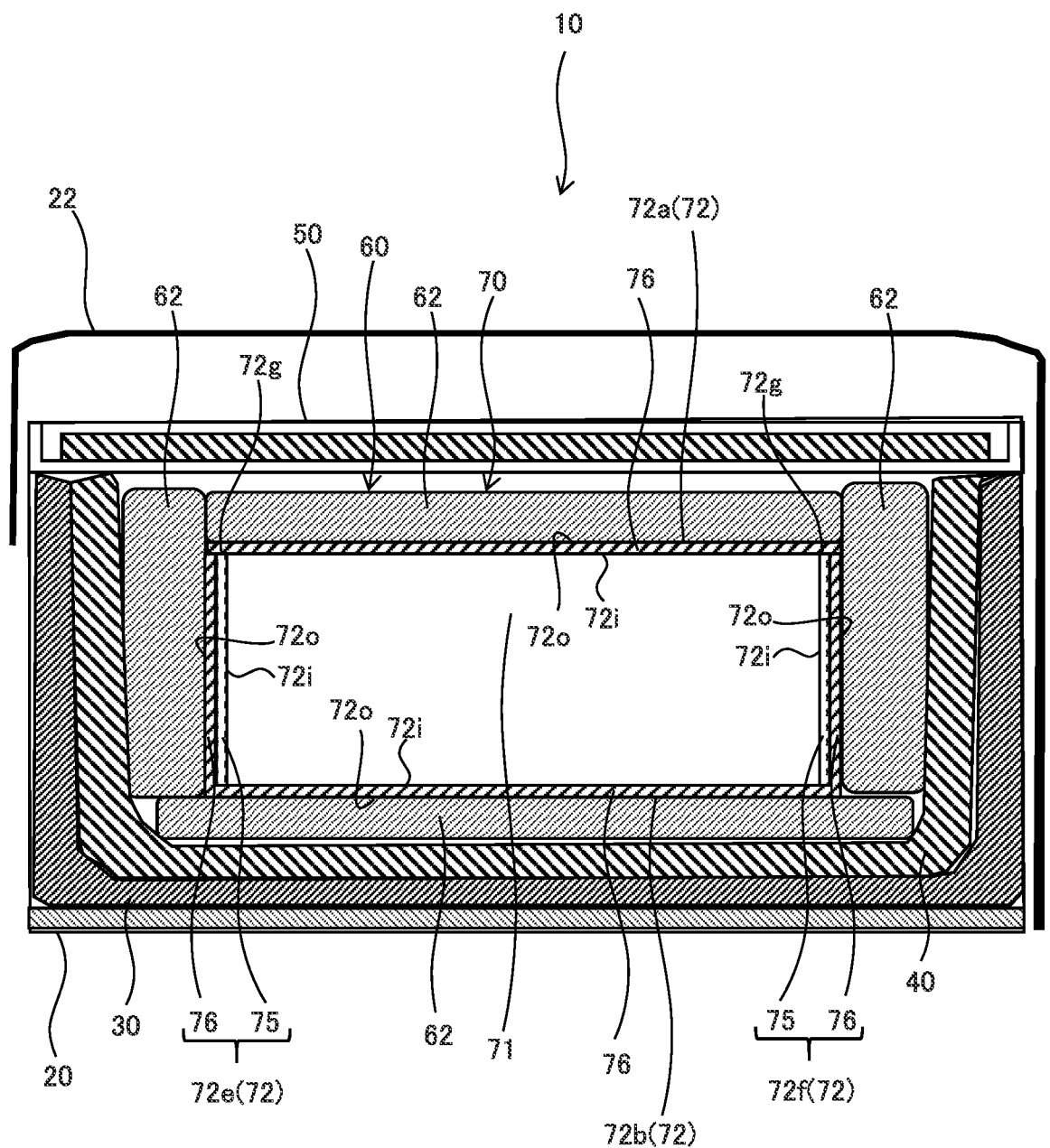
FIG. 11 is a sectional view of the vacuum heat insulating container according to Modified Example 2.

In the heat retaining container 70 in the example of FIG. 11, each of the walls 72 that are the side walls 72c to 72f includes the second wall 76 and the first wall 75 laminated on the inner surface of the second wall 76. Therefore, the inner surfaces of the side walls 72c to 72f are formed by the inner surfaces of the first walls 75, and the outer surfaces of the side walls 72c to 72f are formed by the outer surfaces of the second walls 76. On the other hand, each of the walls 72 that are the ceiling wall 72a and the bottom wall 72b includes the second wall 76. Therefore, the inner surfaces of the ceiling wall 72a and the bottom wall 72b are formed by the inner surfaces of the second walls 76, and the outer surfaces of the ceiling wall 72a and the bottom wall 72b are formed by the outer surfaces of the second walls 76. The ceiling wall 72a may include the first wall 75 and the second wall 76. Or, the bottom wall 72b may include one of the first walls 75 and the second wall 76.

As shown in the examples of FIGS. 10 and 11, in the heat retaining container 70, the ceiling wall 72a covers the upper opening of the side walls 72c to 72f so as to be able to open and close the upper opening. Therefore, when heat outside the heat retaining container 70 enters into the accommodating space 71 through the upper opening and the wall 72, the temperature at the ceiling wall 72a side in the accommodating space 71 tends to be higher than the temperature at the bottom wall 72b side in the accommodating space 71. On the other hand, the heat conductivity of the side walls 72c to 72f located between the ceiling wall 72a and the bottom wall 72b is higher in the surface direction than in the thickness direction. For example, when the ceiling wall 72a and the bottom wall 72b are located so as to be orthogonal to the upper-lower direction, the heat conductivity of the side walls 72c to 72f in the upper-lower direction is high. Therefore, since heat moves between the ceiling wall 72a and the bottom wall 72b along the side walls 72c to 72f, the temperature irregularity of the accommodating space 71 in the upper-lower direction can be reduced. Thus, the temperature in the accommodating space 71 can be uniformized, and the heat retaining time can be increased.

The above embodiments may be combined with each other as long as they do not exclude each other. From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The heat retaining container of the present disclosure is applicable to the heat retaining container which can uniformize the temperature in the accommodating space and increase the heat retaining time.

REFERENCE SIGNS LIST 70 heat retaining container
71 accommodating space
72 wall
72a ceiling wall
72b bottom wall
72c side wall
72d side wall
72e side wall
72f side wall
72i inner surface
72o outer surface
73 binder resin
74 thermally conductive filler
75 first wall
76 second wall

The invention claimed is:

1. A heat retaining container comprising:
an accommodating space; and
walls having inner surfaces surrounding the accommodating space, including:
a side wall defining a pair of openings,
a ceiling wall covering one of the pair of openings so as to open and close the opening, and
a bottom wall covering the other of the pair of openings, wherein
a heat conductivity of the side wall in a surface direction is higher than a heat conductivity of the wall in a thickness direction orthogonal to the inner surface of the side wall, the surface direction being orthogonal to the thickness direction and extending along the inner surface of the side wall;
the side wall includes a first wall and a second wall;
the first wall is a wall in which the heat conductivity in the surface direction is higher than the heat conductivity in the thickness direction;
the second wall is made of resin;
the first wall is laminated on at least one of an inner surface and outer surface of the second wall; and
at least one of the ceiling wall and the bottom wall does not include the first wall but includes the second wall.

2. The heat retaining container according to claim 1, wherein:
the side wall includes a plurality of side wall members, each side wall member includes the first wall, and
the first wall includes binder resin and thermally conductive fillers which have a heat conductivity higher than that of the binder resin and are blended with the binder resin.

3. The heat retaining container according to claim 2, wherein:
the thermally conductive fillers have a shape anisotropy; and
the thermally conductive fillers are located in the wall such that a dimension of each of the thermally conductive fillers in the thickness direction is smaller than a dimension of the thermally conductive filler in the surface direction.

4. The heat retaining container according to claim 2, wherein the thermally conductive fillers have an electrical insulation property.

5. The heat retaining container according to claim 1, wherein:
the side wall includes a plurality of side wall members, each side wall member includes the first wall, and
a ratio of the heat conductivity of the first wall in the thickness direction to the heat conductivity of the first wall in the surface direction is not less than 0.2 and less than 0.8.

6. The heat retaining container according to claim 1, wherein a thickness of the first wall in the thickness direction is 1 mm or less.

* * * * *